US011384706B2

(12) United States Patent
Sen et al.

(10) Patent No.: US 11,384,706 B2
(45) Date of Patent: Jul. 12, 2022

(54) SYSTEMS AND METHODS FOR PREDICTING ENGINE FUEL FILTRATION SYSTEM SERVICE CYCLE

(71) Applicant: Caterpillar Inc., Peoria, IL (US)

(72) Inventors: Sourav Sen, Peoria, IL (US); Steven Tian, Bloomington, IL (US); Brenton William Bush, Peoria, IL (US); Michael T. McKinley, Washington, IL (US)

(73) Assignee: Caterpillar Inc., Peoria, IL (US)

( * ) Notice: Subject to any disclaimer, the term of this patent is extended or adjusted under 35 U.S.C. 154(b) by 272 days.

(21) Appl. No.: 16/716,006

(22) Filed: Dec. 16, 2019

(65) Prior Publication Data
US 2021/0180532 A1 Jun. 17, 2021

(51) Int. Cl.
| | |
|---|---|
| *F02D 41/22* | (2006.01) |
| *B60K 15/03* | (2006.01) |
| *F02M 37/32* | (2019.01) |
| *B01D 35/00* | (2006.01) |
| *B01D 29/60* | (2006.01) |

(52) U.S. Cl.
CPC .......... *F02D 41/22* (2013.01); *B01D 29/606* (2013.01); *B01D 35/005* (2013.01); *B60K 15/03* (2013.01); *F02M 37/32* (2019.01); *B01D 2201/56* (2013.01); *B60K 2015/0321* (2013.01); *B60K 2015/03236* (2013.01); *B60K 2015/03243* (2013.01); *F02D 2041/224* (2013.01); *F02D 2200/0602* (2013.01)

(58) Field of Classification Search
CPC ... F02D 41/22; F02D 2041/224; F02M 37/32; B01D 35/005; B01D 2201/56; B60K 15/03; B60K 2015/0321; B60K 2015/03236; B60K 2015/03243
USPC ........................................................ 701/29.4
See application file for complete search history.

(56) References Cited

U.S. PATENT DOCUMENTS

| | | | |
|---|---|---|---|
| 8,620,597 | B2 | 12/2013 | Nevin et al. |
| 9,976,456 | B2 | 5/2018 | Verdegan et al. |
| 10,119,886 | B2 | 11/2018 | Dhingra et al. |
| 10,184,415 | B2 | 1/2019 | Shimpi et al. |
| 2015/0361840 | A1* | 12/2015 | Verdegan ............. B01D 35/143 702/34 |
| 2016/0320257 | A1* | 11/2016 | Oakes ..................... G01L 23/24 |

(Continued)

FOREIGN PATENT DOCUMENTS

| | | |
|---|---|---|
| CN | 101699055 | 4/2010 |
| GB | 2333244 | 7/1999 |

*Primary Examiner* — Mahmoud Gimie
(74) *Attorney, Agent, or Firm* — Lee & Hayes, PLLC

(57) ABSTRACT

A method for predicating a service life of a fuel filter includes causing a fuel pump of a fuel system to direct fuel through a fuel filter of a fuel system. The method also includes receiving work cycle data from machines that implement a same or similar fuel system. The method further includes receiving, via sensors of the fuel system, fuel system data and determining, from the fuel system data, a pressure difference across the fuel filter. The method further includes determining, based on the work cycle data, predicted load cycle data for the fuel system and determining, via a filter life model, a filter service interval representing an amount of time the fuel filter is operable in the fuel system prior to the pressure difference reaching a predetermined value.

17 Claims, 4 Drawing Sheets

(56) References Cited

U.S. PATENT DOCUMENTS

2019/0153971 A1  5/2019  Prabhala et al.
2021/0134075 A1* 5/2021  Carpenter .............. G07C 5/008

* cited by examiner

SYSTEMS AND METHODS FOR PREDICTING ENGINE FUEL FILTRATION SYSTEM SERVICE CYCLE

TECHNICAL FIELD

The present disclosure relates to a machine with a fuel system. More specifically, the present disclosure relates to systems and methods for monitoring the performance of a fuel filter and for predicting a serviceable life of the fuel filter.

BACKGROUND

Machines that perform work on a site—such as haul trucks, graders, mining trucks, excavators, etc.—typically have combustions engines and fuel systems that provide fuel to the combustion engine. Fuel systems and combustion engines include components having specific tolerances that must be met in order for the fuel system and the combustion engine to perform their respective operations effectively. As such, the components of fuel systems and combustion engines are designed precisely. Such components include consumable components that require maintenance over regular service intervals. These consumable components include filters, belts, gaskets, etc. Often, failure of such consumable components may damage other systems or components of the machine and/or may significantly impact the performance of the machine.

Thus, the serviceable life of consumable components (and/or other components) must be known and/or monitored. For example, an operator of a machine may desire to know and/or monitor the life of a fuel filter. As a fuel filter removes contaminants from the fuel, the life of the fuel filter decreases due to the fuel filter filling with contaminants. In some examples, as the fuel filter life decreases, the fuel filter may allow a growing number of contaminants to pass through the fuel filter. As such, the performance of fuel systems downstream from the fuel filter could be hindered and/or components of the downstream fuel system could be damaged. For example, if a fuel filter begins to pass more (or larger sized) particulate matter than a designed amount, fuel injectors or other components downstream could become plugged or damaged.

Fuel filters eventually need to be cleaned and/or replaced in order to prevent or reduce unwanted impact on performance of fuel systems. U.S. Patent Publication No. 2019/0153971 (hereinafter referred to as the '971 reference) describes a fuel filter monitoring system and method. In particular, the '971 reference describes a monitoring system that monitors the operation of various filtration systems present in an engine. The '971 reference describes, for example, a system that determines an amount of service life remaining for a fuel filter. Such a determination is made by calculating four different values. As explained in the '971 reference, such a process includes calculating the remaining life of a fuel filter based on: (1) a pressure drop across the filter cartridge, (2) an amount of time the filter cartridge has been used, (3) a percent loading of the filter cartridge based on the pressure drop, and (4) a percent loading of the filter cartridge based on the amount of time the filter cartridge has been used. The '971 reference does not, however, describe predicting an expected performance of the fuel filter at different times in the service life. Rather, the '971 merely determines current conditions of the fuel system to predict the remaining service life of the fuel filter. As a result, the systems and methods described in the '971 reference are not configured to, among other things, determine predicted performance of the fuel filter. Nor are the systems and methods of the '971 reference configured to determine a predicted service life of the fuel filter that correlates with the predicted performance.

Examples described in the present disclosure are directed toward overcoming the deficiencies described above.

SUMMARY

As will be described in greater detail below, an example method for predicting life of a fuel filter in a fuel system includes identifying one or more machines implementing a same or similar type of fuel system and retrieving work cycle data from the one or more machines, the work cycle data including at least one of engine speed data, fuel pressure data, or fuel flow rate data. The method also includes causing a fuel pump of the fuel system to direct fuel through the fuel filter and the fuel system such that a first flow rate of fuel through a first portion of the fuel system is substantially equal to a second flow rate indicated by the work cycle data and a first fuel pressure of fuel in the first portion of the fuel system is substantially equal to a second fuel pressure indicated by the work cycle data. The method further includes receiving, from one or more sensors of the fuel system, fuel system data, determining, from the fuel system data, a pressure difference across the fuel filter, determining that the pressure difference across the fuel filter is above a predetermined pressure difference threshold, wherein the predetermined pressure difference threshold is based at least in part on a type of filter media of the fuel filter, and determining a service life of the fuel filter based at least in part on the pressure difference being above the predetermined pressure difference threshold and on a filter life model, wherein the service life represents an amount of time that the fuel filter operates in the fuel system before the pressure difference reaches or exceeds the pressure difference threshold.

Additionally, an example fuel system of the present disclosure includes a reservoir, at least one fuel pump, a fuel filter having a filter media, one or more sensors, and a fuel system controller in communication with at least the one or more sensors and the fuel pump. In such examples, the system controller is configured to receive work cycle data from one or more machines that utilize a same or similar fuel system, the work cycle data including at least fuel system pressure data and fuel flow rate data. The fuel system controller is further configured to cause the fuel pump of the fuel system to direct fuel through the fuel filter and the fuel system, receive, via the one or more sensors of the fuel system, fuel system data, and determine, from the fuel system data, a pressure difference across the fuel filter. The fuel system controller is also configured to determine, via a filter life model, predicted load cycle data for the fuel system based at least in part on the work cycle data, and determine, via the filter life model, a service life for the fuel filter based at least in part on the pressure difference and the predicted load cycle data, the service life representing at least a remaining amount of time that the fuel filter will operate in the fuel system before the pressure difference reaches or exceeds a predetermined threshold.

Further, an additional method of the present disclosure includes pumping, by a fuel pump, fuel through a fuel filter and a fuel system. The method also includes receiving work cycle data from one or more machines, the work cycle data including at least one of fuel flow rate data or fuel pressure data. The method further includes determining, via one or more sensors of the fuel system, a pressure difference across the fuel filter, determine, via a filter life model, predicted load cycle data for the fuel system based at least in part on the work cycle data, and determining, via the filter life model, a filter service interval based at least in part on the pressure difference and the predicted load cycle data, the filter service interval representing an amount of time that the fuel filter is operable in the fuel system before the pressure difference reaches a predetermined value.

DETAILED DESCRIPTION

Figure 1:
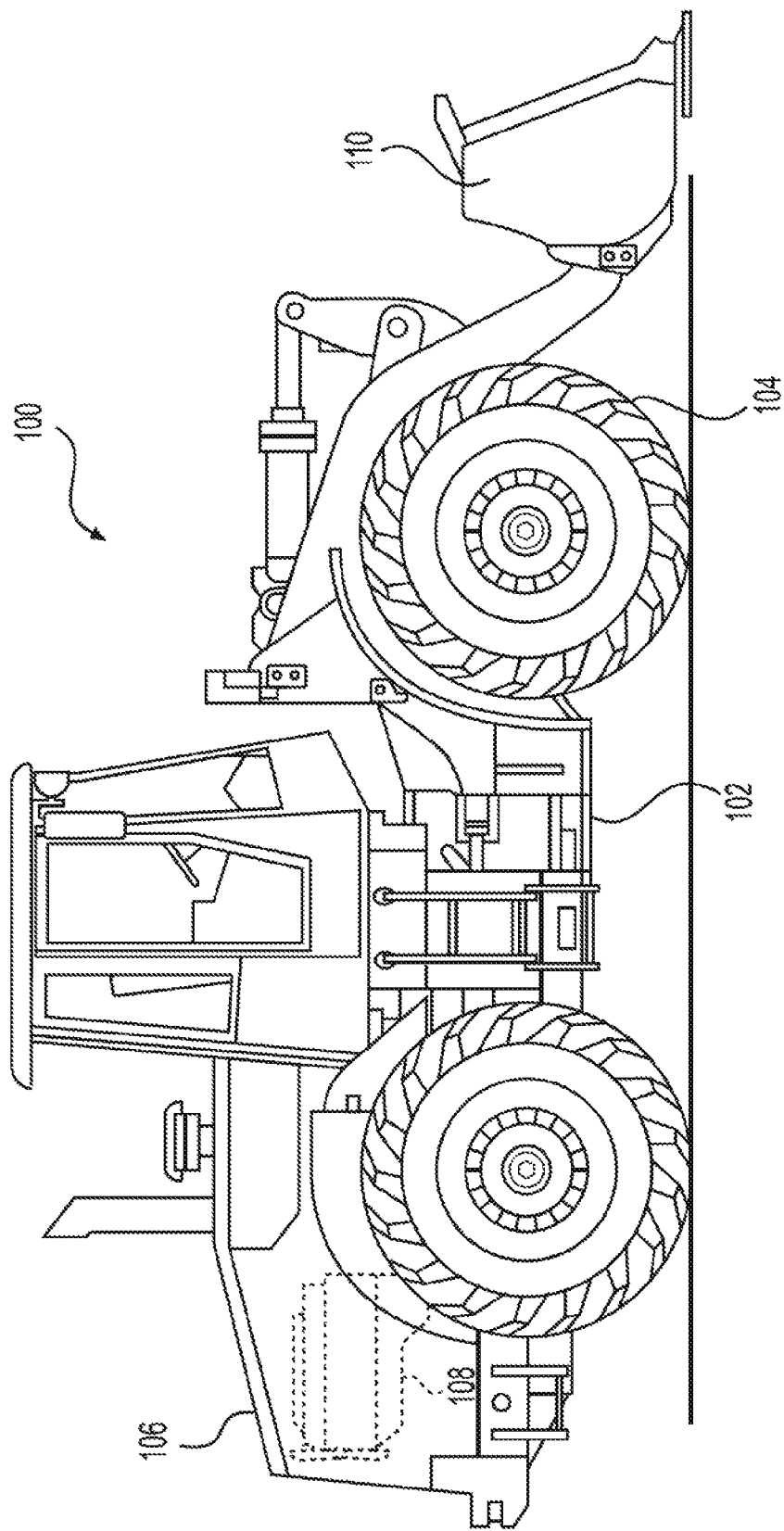
FIG. 1 is an illustration of an exemplary disclosed machine.

Wherever possible, the same reference numbers will be used throughout the drawings to refer to the same or like parts. FIG. 1 shows an exemplary machine 100. In this example, the machine 100 is a wheel loader. However, the machine 100 may embody any type of machine that performs work on a site, such as an articulated haul truck, a motor grader, a mining truck, a loader, an excavator, a grader, etc. Alternatively, machine 100 may embody a stationary system, such as a power-generation system or a fluid-pumping system. In the example shown, machine 100 includes, among other components, a chassis 102 supported by traction devices 104 (e.g., wheels, tires, etc.), a power source enclosure 106 mounted to chassis 102, and a power source (e.g., combustion engine) 108 within enclosure 106 and operable to drive the traction devices 104 (and thus, to propel the machine 100), and/or to power other systems of machine 100, such as one or more hydraulic cylinders or other mechanisms configured to actuate a work implement 110 connected to the machine 100. In some examples, the engine 108 includes a fuel system in fluid communication with the engine 108 and/or other components of the machine. Such a fuel system is shown and described with respect to FIG. 2.

Figure 2:
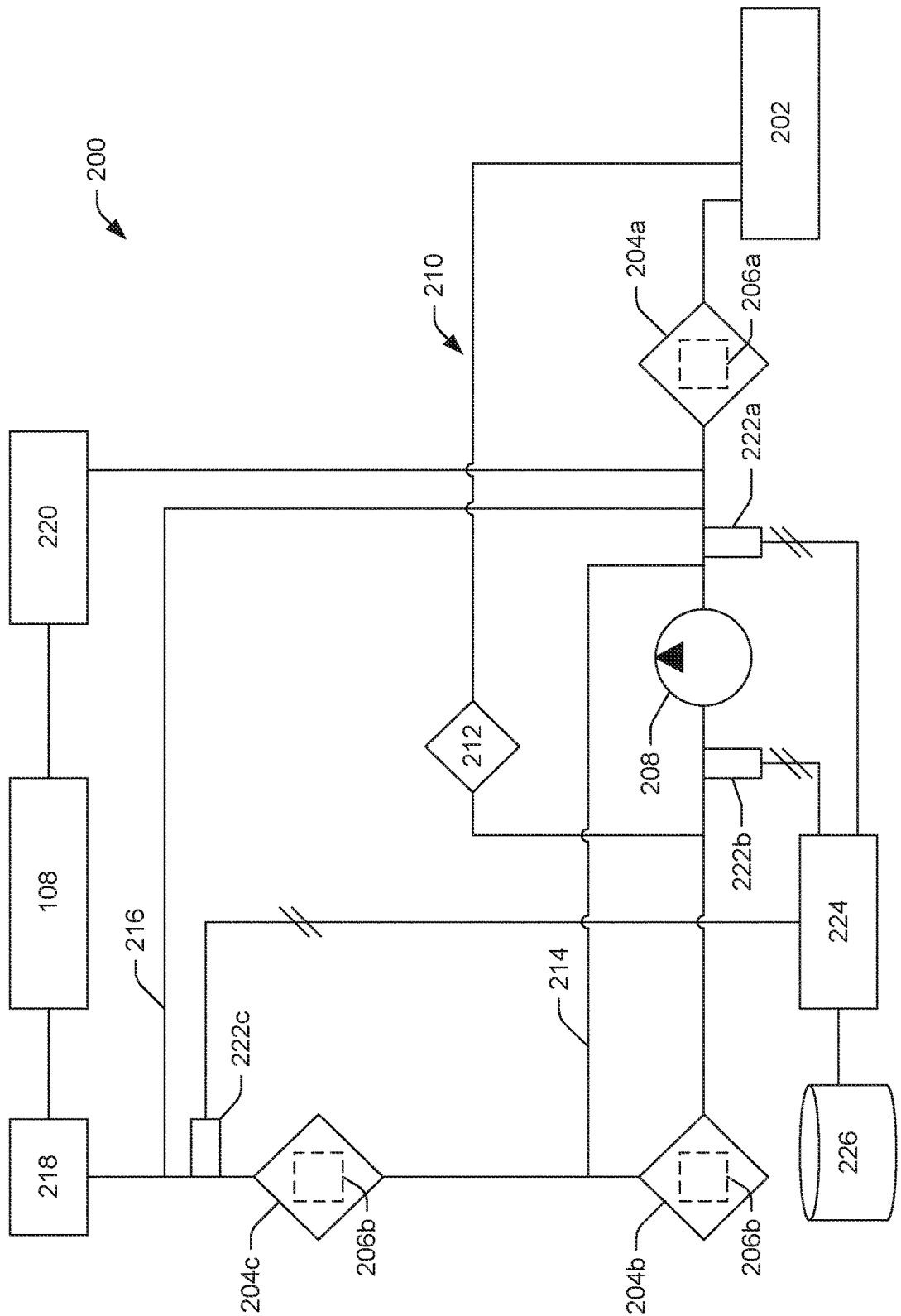
FIG. 2 is a schematic illustration of a fuel system in accordance with an example of the present disclosure.

FIG. 2 provides a schematic diagram showing other exemplary systems of the machine 100. For example, the machine 100 may include, among other systems, a fuel system 200. As will be described further herein below, the fuel system 200 may include one or more components that monitor and/or predict a service life of a fuel filter and/or filter media. As mentioned previously, the fuel system 200 may be in fluid communication with the engine 108 of the machine 100 and/or other components of the machine 100. The fuel system 200 is configured to provide fuel to the engine 108 of the machine 100 and/or other components of the machine 100. In some examples, the fuel system 200 includes a fuel reservoir 202 that is configured to store fuel in the fuel system 200. The fuel system 200 may further include a primary fuel filter 204a, a secondary fuel filter 204b, a tertiary fuel filter 204c, and/or one or more additional fuel filters (collectively, referred to herein as "fuel filters 204") that are in fluid communication with one another and in fluid communication with other components of the fuel system 200. The fuel filters 204 are configured to filter contaminants from the fuel as the fuel is cycled through the fuel system 200. Such contaminants may include, but are not limited to, particulate matter (such as sediment, rust, metal fragments, etc.), paraffins, water, etc. The fuel filters 204 may include varying filter media 206. In some examples, the filter media may have varying micron ratings and/or efficiency ratings. As used herein, the micron rating may indicate the ability of the filter media to remove contaminants by a specific size of particle. For example, a fuel filter 204 having a filter media 206 that includes a micron rating of 10 microns (or micrometers) may be capable of filtering particles as small as 10 microns. Additionally, and/or alternatively, the fuel filter 204 may include varying efficiency ratings. That is to say, a fuel filter efficiency rating may indicate the ability of the fuel filter 204 to trap particulate in a fluid under specified conditions. In some examples, the filter efficiency may be calculated directly from a beta ration of the fuel filter 204. Beta ratings may be expressed as a ratio of the total number of inlet particles to the number of passed particles (i.e., particles that pass through the fuel filter 204) and may be represented as $\beta_x$, wherein x is the particle size in microns. For example, a fuel filter may include a beta ratio of $\beta_5=50$ represents that out of 100 total particles that flow into the fuel filter 204, 2 particles will pass through the fuel filter 204. The beta ratio may be represented at varying particle sizes. In the example above, a beta ratio of $\beta_5=50$ means that for particles that are 5 microns or larger, the fuel filter 204 has a beta ratio of 50. From the beta ratio, a filter efficiency is calculated. For example, the filter efficiency value may be calculated by the following equation:

$$\text{Efficiency} = \frac{(\beta - 1)}{\beta} * 100\% \quad (1)$$

From equation (1), the filter efficiency value for a beta ratio of 50 is 98%. In some examples, the primary fuel filter 204a may include a first filter media 206a, while the secondary fuel filter 204b and the tertiary fuel filter 204c may include a second filter media 206b. Furthermore, the secondary fuel filter 204b and the tertiary fuel filter 204c may include different filter media, in some examples. In some examples, the condition, estimated life span, and/or other characteristics of the filter media 206 for the fuel filters 204 may be determined from the process described further herein below.

The fuel system 200 may further include one or more fuel pumps 208. While FIG. 2 depicts a single fuel pump 208, it is to be understood that any number of fuel pumps may be implemented in any portion of the fuel system 200. The fuel pump 206 is configured to increase a fluid pressure of the fuel, and to pump and/or otherwise direct the fuel through the fuel system 200. In example embodiments, the fuel system 200 may further include a return loop 210. The return loop 210 may return excess fuel from the fuel system 200 to the fuel reservoir 202. The return loop 210 may include a loop filter 212. The loop filter 212 may filter contaminants from the fuel in order to reduce and/or prevent contamination build up in the fuel reservoir 202. In example embodiments, the fuel system 200 may further include secondary and/or tertiary return flow lines (also referred to collectively herein as "return flow lines") The secondary return flow line 214 and the tertiary return flow line 216 may direct excess (or other) fuel from the fuel system 200 to any point in the fuel system 200. For example, the secondary flow line 214 may direct fuel from the secondary fuel filter 204b to the fuel reservoir 202 and/or to other portions of the fuel system 200. While FIG. 2 depicts the return flow lines 214 and 216 as being fluidly connected downstream of the secondary fuel filter 204b and the tertiary fuel filter 204c respectively, it is to be understood that the return flow lines may be located at any point in the fuel system 200.

Furthermore, the fuel system 200 may include a fuel injection system 218. In examples, the fuel injection system 218 may pressurize the fuel in the fuel system 200 prior to injection into an engine 108. The fuel may then be consumed in an internal combustion process in the engine 108. Any excess fuel may reach a return flow division 220 at which, the fuel system 200 may direct the excess fuel back to the fuel reservoir 202 and/or back to the fuel pump 208, as is shown in FIG. 2. Additionally, and/or alternatively, the return flow division 220 of the fuel system 200 may direct excess fuel downstream of the engine to any one or more of the components described herein above.

The fuel system 200 may further include one or more sensors such as a first sensor 222a, a second sensor 222b, and/or a third sensor 222c (referred to herein collectively as "the sensors 222"). The sensors 222 may include flow sensors that measure, calculate, and/or otherwise determine the rate at which fuel flows through one or more portions of the fuel system 200. The sensors 222 may also measure, calculate, and/or otherwise determine an amount of fuel that flows through the fuel system 200. Furthermore, the sensors 222 may include particle counters that measure, calculate, and/or otherwise determine an amount of and/or a size of particulate matter that is present in the fuel and/or one or more portions of the fuel system 200. In some examples, the particle counters may be located downstream and/or upstream of one or more of the fuel filters 204. In such an example, the particle counters may monitor an amount of particulate matter that is passing through the fuel filters 204. The sensors 222 may include pressure and temperature sensors that measure, calculate, and/or otherwise determine the pressure and/or temperature of the fuel as it passes through the fuel system 200. In some examples, the different types of sensors (e.g., particle counters, flow meters, etc.) described above may be included in a single sensor capable of measuring the above described metrics. Additionally, and/or alternatively, the fuel system 200 may include multiple sensors 222 that measure one or more of the above described metrics.

The fuel system 200 may further include a fuel system controller 224 (also referred to herein as "the controller") configured to control operations of the fuel system 200. Furthermore, the fuel system controller 224 may monitor and/or predict the service life of the fuel filters 204 at different points in time of the serviceable life of the fuel filters 204. The controller 224 may be, for example, a hardware electronic control module (ECM) or other electronic control unit (ECU). The controller 224 may include, for example, a core microcontroller, memory (e.g., RAM), storage (e.g., EEPROM or Flash) configured to perform the described functions of the controller 224. The controller 224 may be dedicated to control the operations of the fuel system 200 or may additionally control other systems of machine 100. Instead of, or in addition to, an ECM/ECU, the controller 224 may include a general computer microprocessor configured to execute computer program instructions (e.g., an application) stored in memory to perform the disclosed functions of controller 224. The controller 224 may include a memory, a secondary storage device, a processor, and/or any other computing components for running an application.

Various other circuits may be associated with controller 224 such as power supply circuitry signal conditioning circuitry, or solenoid driver circuitry. In examples, the controller 224 and/or a portion of components of the controller 224 may be located remotely from the fuel system 200 and may be communicatively coupled to the fuel system 200. The controller 224 may rely on one or more data maps, look-up tables, neural networks, algorithms, machine learning algorithms, data layers, predictive layers, and/or other components relating to the operating conditions and the operating environment of the fuel system 200 that may be stored in the memory of the controller 224 and/or the database 226. Each of the data maps noted above may include a collection of data in the form of tables, graphs, and/or equations to maximize the performance and efficiency of the fuel system 200 and its operation.

The controller 224 may be communicatively coupled to control various components of the fuel system 200 and/or various components of the machine 100. The controller 224 may be communicatively coupled to the various components via a wired or wireless connection. The controller 224 receives inputs, in the form of electromagnetic signals, from components of the fuel system 200 and/or the machine 100. The controller 224 processes the inputs—such as using a filter life model described below—and provide corresponding output signals to components of the fuel system 200 and/or the machine 100. As mentioned previously, the controller 224 may store data corresponding to one or more of the inputs in data storage 226 (e.g., memory or database). The controller 224 may also be configured to store data corresponding to one or more of the outputs in data storage 226. The controller 224 may be configured to accumulate the data corresponding to the inputs and/or the outputs over time in the data storage 226. The controller 224 may be further configured to analyze the accumulated data as described below.

Figure 3:
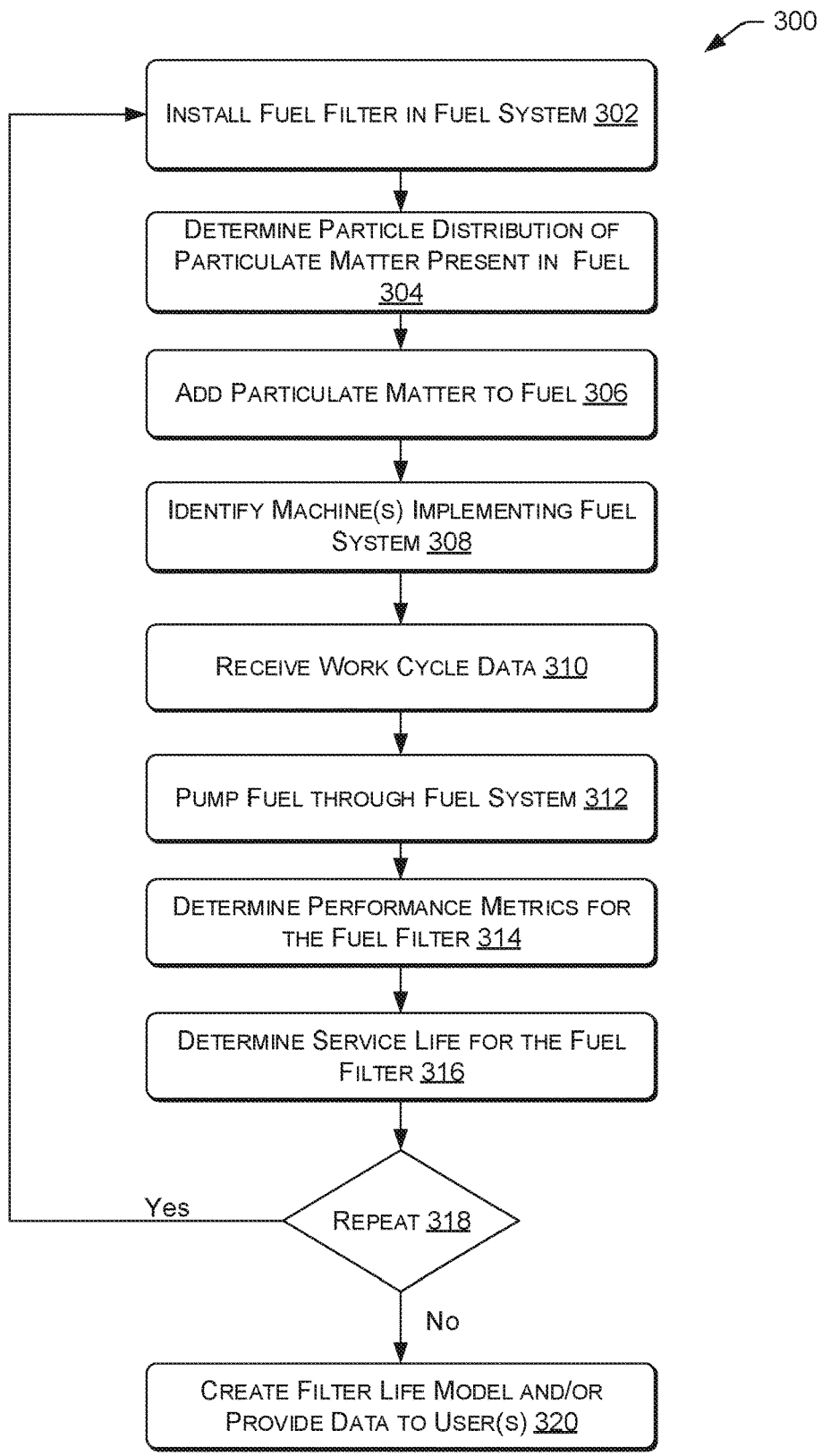
FIG. 3 is a flowchart illustrating an exemplary disclosed process for creating a filter life model used by the fuel system of FIG. 2.

FIG. 3 shows an exemplary method 300 for creating a filter life model that may determine the service life for the fuel filter 204 and/or additional fuel filters and/or filter media, consistent with examples of the disclosure. In some examples, the method 300 may represent a test and/or a series of tests that generate test data that may be used by the filter life model to determine the service life of the fuel filter. The filter life model may represent the performance of the fuel filter 204 under real world conditions (i.e., real world machine loading, degradation of the fuel filter and/or the filter media). The filter life model may be configured to output, among other outputs, a predicted service life of the fuel filter 204 from one or more inputs to the controller 224. In some examples, the inputs may be received from one or more components of the fuel system 200 (i.e., sensors 222, fuel pump 206, etc.). Such inputs may include, but are not limited to, a pressure of fuel at different points in the fuel system, fuel flow rate, fuel consumption, an area of the filter media, load cycle of the fuel system, load cycle data from one or more additional fuel systems, an operating location of the fuel system, a fuel cleanliness rating, a type of filter media for the fuel filter, particle distribution of contaminants present in the fuel, etc.

The example method 300 is illustrated as a collection of steps in a logical flow diagram, which represents operations that may be implemented in hardware, software, or a combination thereof. In the context of software, the steps represent computer-executable instructions stored in memory. Such computer-executable instructions may include routines, programs, objects, components, data structures, and the like that perform particular functions or implement particular abstract data types. The order in which the operations are described is not intended to be construed as a limitation, and any number of the described steps may be combined in any order and/or in parallel to implement the process. For discussion purposes, and unless otherwise specified, the method 300 is described with reference the machine 100, the fuel system 200, and/or other items shown in FIGS. 1 and 2. In particular, and unless otherwise specified, the method will be described below with respect to the controller 224 for ease of description.

With reference to FIG. 3, at 302 a fuel filter 204 is installed in a fuel system 200. In some examples, a human user may install the fuel filter 204 on the fuel system 200. The fuel system 200 may be a test bench configured to emulate a fuel system that is implemented in a machine 100. Additionally and/or alternatively, the fuel system 200 may be a real-world fuel system implemented in a machine, such as machine 100, for example. The fuel filter 204 includes a filter media 206 configured to alter the quality of fuel that passes through the filter media. For example, the filter media may remove sediment, rust, metal, water, paraffins, and/or other contaminants from the fuel as the fuel passes through the filter media. As mentioned previously, the fuel system 200 may include multiple fuel filters 204 having varying types of filter media 206. For example, the primary fuel filter 204a may include a filter media having a first micron rating and/or a first efficiency rating while the secondary fuel filter 204b and/or the tertiary fuel filter 204c may include a filter media having a second micron rating and/or a second efficiency rating. It is to be understood that each of the fuel filters 204 may include a same filter media type in some examples. Additionally, and/or alternatively, each of the fuel filters 204 may include different types of filter media 206. For example, the primary fuel filter 204a may include a filter media 206a having a 10 micron rating and/or beta rating of $\beta_{14}=33$, while the secondary fuel filter 204b and the tertiary fuel filter 204c may include filter media 206b having a 2 micron rating and/or a beta rating of $\beta_{14}=375$. In some examples, the type of filter media 206 selected for the fuel filter 204 may depend on the particular fuel system 200 for which the fuel filter 204 will be used and/or on the location of the fuel filter 204 within the fuel system 200. That is to say, the type of filter media 206 may vary depending on the fuel system 200 in which the fuel filter 204 may be used and on the location and/or use of the fuel filter 204.

At 304, the controller 224 may determine a particle distribution of particulate matter that is present in the fuel. For example, the controller 224 may receive one or more inputs from a user indicating an expected operating location of the fuel system 200. The controller 224 may determine a fuel cleanliness rating from a database indicating the fuel cleanliness rating of available fuels that correspond with the expected operating location of the fuel system. For example, the controller 224 may receive one or more inputs indicating that the fuel system 200 may (and/or is) operate in India. The controller 224 may then determine from a world-wide fuel survey, information stored in memory, or may look up from the intranet one or more fuel types that are available in such a region. As mentioned previously, the one or more available fuel types may include an International Organization for Standardization (hereinafter "ISO") cleanliness code (or fuel cleanliness rating) indicating an amount of contamination present in the fuel. The controller 224 may determine a particle distribution of contaminants (or "particulate matter") present in the available fuel based at least in part on the fuel cleanliness rating. In some examples, the controller may receive data from one or more sensors (such as particle sensors) indicating a quantity and/or size of particle present in the fuel. Additionally, and/or alternatively, the controller 224 may use a lookup table to make such a determination. Still further, in examples, the controller 224 may implement a trained algorithm to calculate the particle distribution of contaminants present in the available fuel. Such a particle distribution may include data representing a quantity of particles present in the fuel. Furthermore, the particle distribution may include a quantity of particles for every particle size of particulate matter present in the available fuel. In some examples, the particle distribution may be represented as a particle distribution histogram. The controller 224 may output via a user interface or otherwise provide the particle distribution to a user. In such an example, the controller 224 may determine: a first particle distribution in the available fuel based on the fuel cleanliness rating, a second particle distribution in the fuel currently present in the fuel system, and an amount of particulate matter to be added to the fuel such that the second particle distribution is substantially similar to the first particle distribution. In other words, in the case of conducting tests, a user may desire to add particulate matter to and/or remove (filter) particulate matter from fuel prior to conducting testing, such that the fuel used in the test is substantially the same as the available fuel in a location in which the fuel system 200 is to be implemented.

At 306, a user may add particulate matter to the fuel in the fuel system 200 such that the fuel includes a particle distribution that is substantially similar (or the same as) to a particle distribution in the available fuel at the expected operating location for the fuel system 200. Additionally, and/or alternatively, a user may filter particulate matter from the fuel in the fuel system 200 such that the fuel includes a particle distribution that is substantially similar to a particle distribution in the available fuel at the expected operation location for the fuel system 200.

At 308, the controller 224 may identify one or more machines that implement the fuel system 200 and/or a same or similar type of fuel system. That is to say, the controller 224 may receive work cycle data from one or more machines that operate under similar work cycle conditions as the fuel system 200.

At 310, the controller 224 may receive work cycle data from one or more machines. In some examples, the controller 224 may receive work cycle data from one or more machines that implement the fuel system 200. The work cycle data may represent field data representing a machine load histogram of the one or more machines as the one or more machines operate in the real world (i.e., at worksites). The work cycle data may include data representing engine speed, engine fueling and refueling, fuel system pressures, fuel flow rate, fuel consumption, etc. In some examples, the controller 224 may continually update the memory 226 (or database) with work cycle data received from the one or more machines. The controller 224 may collect such work cycle data and may determine averages from the work cycle data. As will be described further herein below, the work cycle data may be implemented to perform bench tests representing real-world work cycle filter testing.

At 312, the controller 224 may cause the fuel pump 206 to direct fuel through the fuel system 200 such that a fuel flow rate and/or fuel system pressure is substantially similar to the work cycle data from the one or more machines. Typically, a service life of a fuel filter is based on assumed steady state conditions (i.e., constant fuel flow and/or fuel pressures). However, such steady state conditions do not represent real-world work conditions. Therefore, the controller 224 causes the fuel pump 206 to direct fuel through the fuel system 200 such that fuel flow in the fuel system 200 substantially emulates real world work cycle conditions (e.g., idling, loading, turning, lifting, accelerating, etc.). For example, the controller 224 may cause the fuel pump 206 to direct fuel through the fuel system 200 under rates and/or pressures that directly correlate with a machine that is lifting a load, sitting idle, turning, accelerating, moving uphill, moving downhill, transitioning between states, etc. For example, at 750 RPM the fuel pump 208 may pump fuel through the fuel system 200 at a rate of approximately 4 liters/minute. As the RPM of the engine 108, the fuel flow rate will increase as well.

At 314, the controller 224 determines one or more performance metrics for the fuel filter 204 and/or the fuel system 200. For example, the controller 224 may receive, from one or more sensors 222 of the fuel system 200, fuel system data. From the fuel system data, the controller 224 may determine a pressure difference across the fuel filter 204 as fuel is pumped through the fuel system 200. In some examples, the controller 224 may monitor and/or record the pressure difference across the fuel filter 204 over time. The pressure difference may be determined by subtracting downstream pressure from upstream pressure across the fuel filter 204. The controller 224 may further determine a filter efficiency value for the fuel filter 204 based at least in part on particle data received from one or more particle counters of the fuel system 200, which may be included in the fuel system data. The filter efficiency value may be defined by a beta rating (or "beta/filter efficiency value") described above. The controller 224 may further determine an amount (or quantity) of particulate matter that is captured by the fuel filter 204 via the one or more particle counters. Additionally, and/or alternatively, the controller 224 may determine a total amount of particulate matter present in the fuel system 200. Such a determination may be made based at least in part on fueling and refueling data indicating fuel consumption of the fuel system 200. For example, the controller 224 may determine a particle distribution of particulate matter (or other contaminants) present in the fuel. In such an example, the controller 224 may also determine and/or track a volume of fuel that is added to the fuel system 200. From the particle distribution and the volume of fuel consumed by the fuel system 200, the controller 224 may calculate a total amount of particulate matter present in the fuel system 200. For example, if the controller 224 determines that there are 1,000 particles in 1 liter of fuel, then the controller may determine that there are 10,000 particles in the fuel system once 10 liters of fuel have been added to the fuel system 200. In other words, the controller 224 may use the determined particle distribution at 304 to calculate a total amount of particulate matter present in the fuel based on fuel consumption and/or refueling data. The controller 224 may further determine an amount of time that fuel has passed through the fuel filter 204 (i.e., an amount of time the fuel filter 204 has been installed and the machine has been operating). The controller 224 may be further configured to determine, from the fuel system data, a fuel flow rate for the fuel that passes through the fuel filter 204. The controller 224 may further be configured to determine a degradation rate of the fuel filter 204. Such a degradation rate may represent a correlation of filter efficiency of the fuel filter 204 relative to time. For example, as the fuel filter 204 is filtering contaminants from the fuel, the filter efficiency may begin to decrease over time. While specific metrics are described herein above, it is to be understood that the controller 224 may determine additional performance metrics associated with the fuel filter 204 and/or the fuel system 200. For any and/or each of the performance metrics, the controller 224 may track such performance metrics over time and store historical performance data in the database 226.

At 316, the controller 224 may determine a service life for the fuel filter 204. The service life represents a total amount time that the fuel filter may be used in an efficient manner (i.e., an amount of time the fuel filter may be used before the performance of the fuel filter degrades past a predetermined point). In some examples where the fuel system 200 includes more than one fuel filter 204, the controller 224 may determine a service life for each fuel filter 204 in the fuel system 200. Additionally, and/or alternatively, the controller 224 may determine a composite service life for the fuel system 200 that represents an average service life of the fuel filters 204 and/or the shortest service life of the fuel filters 204. In order to determine the service life for the fuel filter 204, the controller 224 may analyze the performance metrics described above. For example, the controller 224 may determine whether the pressure difference across the fuel filter 204 is above a predetermined threshold. If the pressure difference across the fuel filter 204 has reached and/or exceeded the predetermined threshold, the controller 224 may determine that the fuel filter 204 has reached the end of the service life for the fuel filter 204. The controller 224 may then determine an amount of time that the fuel filter 204 has been in service and may determine the service life for the fuel filter 204 based on the amount of time. In other words, the controller 224 may determine the service life of the fuel filter 204 based on an amount of time (e.g., hours of operation) that passes for the pressure difference across the fuel filter 204 to meet and/or exceed a predetermined threshold (e.g., 100 kPa, or other predefined pressure value). The predetermined threshold pressure may be determined based on one or more factors including, but not limited to, the fuel cleanliness rating, the work cycle data, the filter media, etc.

Additionally, and/or alternatively, the controller 224 may correlate the pressure difference with the amount of particulate matter trapped by the fuel filter 204. The controller 224 may use such a correlation to predict the service life of the fuel filter 204 and/or other fuel filters as the fuel filter 204 traps particulate matter present in the fuel. For example, the controller 224 may determine, from test data or other data, a specified pressure difference that indicates that the fuel filter 204 has reached the end of the service life. When the fuel filter 204 reaches the end of the service life, the controller 224 may determine an amount of particulate matter that has accumulated in the fuel filter 204. Thus, the controller 224 may determine the remaining service life of the fuel filter 204 based on the pressure difference and/or the amount of accumulated particulate matter by the correlation described above. For example, the controller 224 may determine, from test data, a pressure difference and an amount of particulate matter that is indicative of the fuel filter 204 reaching the end of the service life. The controller 224 may monitor the pressure difference and the accumulated particulate matter in the fuel filter 204 and use the correlation from the test data to estimate the remaining life of the fuel filter 204. The controller 224 may further correlate the amount of particulate matter trapped by the fuel filter 204 with an area of the filter media. Such a correlation represents the amount of particulate matter trapped by the fuel filter 204 per unit area (square meters) of the filter media. The controller 224 may also correlate the amount of particulate matter trapped by the fuel filter 204 with a fuel flow rate and/or fuel consumption. Such a correlation represents the amount of particulate matter trapped by the fuel filter at the fuel flow rate and/or by the amount of fuel consumed by the fuel system 200. Still further, the controller 224 may correlate the pressure difference with the amount of particulate matter trapped by the fuel filter 204. From such a correlation, the controller 224 may determine a predicted amount of particulate matter that accumulates in the fuel filter 204 in order for the pressure difference across the fuel filter 204 to reach or exceed a predetermined value/threshold. In some examples, any one and/or all of the correlations described above may be used as inputs when determining the service life of the fuel filter 204.

Additionally, and/or alternatively, the service life of the fuel filter 204 may be based on the filter efficiency value described above. For example, the controller 224 may determine whether the fuel filter 204 efficiency reaches and/or drops below a predetermined filter efficiency threshold. The controller 224 may determine the service life of the fuel filter 204 based on an amount of time that passes before the filter efficiency value meets and/or drops below a predetermined efficiency threshold. Additionally, and/or alternatively, the controller 224 may determine the service life of the fuel filter 204 based on an amount of particulate matter that accumulates in the fuel filter 204 before the efficiency values reaches and/or drops below the predetermined efficiency threshold. It is to be understood that the controller 224 may analyze additional performance metrics of the fuel filter 204 and/or the fuel system 200 to determine the service life of the fuel filter 204.

At 318, the controller 224 may receive an indication of whether the method 300 is to be repeated from test procedure data or a user. If at 318, the method 300 is to be repeated (Step: 318—Yes), the method 300 may begin again at 302 by awaiting installation of another fuel filter into the fuel system 200. Once the other fuel filter is installed, the controller 224 may receive an indication that the other fuel filter has been installed. Such an indication may include, the fuel filter type, size, and/or filter media. In some examples, the method 300 may be completed for differing types of fuel filters 204 and/or filter media. In further examples, the method 300 may be completed for different test benches and/or fuel systems. Through repeating such a method 300, the controller 224 may generate service life data for varying types of fuel filters, filter media, fuel (e.g., fuel having different levels of cleanliness), fuel systems, etc.

If at 318, the controller 224 receives an indication that the process 300 is not to be repeated (Step: 318—No), the controller 224 may create a filter life model for determining the service life of the fuel filter 204, at 320. The filter life model may be generated from test data generated from the method 300 shown and described in FIG. 3. In some examples, the controller 224 may send data via a network or other wireless (and/or wired) communication to a computing system that may create the filter life model. The controller 224 may create the filter life model based in part on the performance metrics for the fuel filter 204 and/or the fuel system 200. In an embodiment, the filter life model may include a physics-based model. For example, the physics-based model may include a computer-aided engineering model (CAE). As is known in the art, CAE modeling may use computer software to aid in engineering analysis, such as finite element analysis (FEA), computational fluid dynamics (CFD), etc. The filter life model may further include a surrogate model that may be trained using supervised learning techniques—such as linear regression, random forests, a Gaussian process, support vector machines, deep neural networks, response surfaces, kriging, or other supervised learning techniques known in the art. After training the surrogate model, the surrogate model may be implemented on the controller 224 as the filter life model.

In some examples, the filter life model may be configured to determine a service life of a fuel filter from one or more inputs such as a type of filter media, filter size, cleanliness rating of fuel (ISO code), type of fuel system, operating location of the fuel system, historic and/or current work cycle data from the fuel system and/or additional fuel systems, one or more performance metrics, etc. Additionally, and/or alternatively, the filter life model may determine, from the one or more inputs, a predicted performance of the fuel filter 204 and/or fuel system 200 at varying times in the service life of the fuel filter and/or at different load cycle conditions. For example, the filter life model may determine an expected filter life and/or an expected performance at various times in the service life interval. Such expected (or predicted) performance may include a predicted load cycle of the fuel system (e.g., predicted flow rate, predicted fuel consumption, predicted fuel system pressure, etc.), predicted pressure difference across the fuel filter 204, predicted filter efficiency value(s) (e.g., filter efficiency values at various particle sizes), predicted quantity and/or size of particles that may pass through the fuel filter 204, degradation rate of the fuel filter 204. In some examples, the filter life model may calculate a predicted efficiency at any time during the service life interval of the fuel filter 204 based at least in part on the degradation rate of the fuel filter 204 and a predetermined end of life performance of the fuel filter 204. Such a calculation may be given by the following equation:

$$\beta(t) = \beta(0)\frac{[(100 - EOL)e^{-\gamma t} + EOL]}{100} \quad (2)$$

where $\beta$=filter efficiency, t=time, EOL=end of life performance (e.g., filter efficiency percentage at the end of service life), and $\gamma$=degradation rate of the fuel filter determined from test data. So, in order to calculate the service life $T_{total}$ when $$\left(\frac{\delta\beta}{\delta t} < x\%\right)$$

equation (2) may be differentiated and solved for T resulting in the following equation:

$$T_{total} = -\frac{1}{\gamma}\ln\left[\frac{x}{100 - EOL} * \frac{1}{\beta_0 * \gamma}\right] \quad (3)$$

where $T_{total}$=the service life of the fuel filter. Thus, the service life of the fuel filter 204 may be calculated by equation (3).

Furthermore, the filter life model may be configured to determine a recommended fuel filter 204 size and/or type of filter media. For example, the filter life model may determine a recommended (or ideal) fuel filter size and/or media based on a type of fuel system, fuel cleanliness rating, or a desired service life interval (e.g., 1000 hours). That is to say, a user may input one or more design criteria into the filter life model such as the type of fuel system and a desired service life interval. In response, the filter life model may output one or more fuel filters (sizes and/or media) that would meet such criteria. Such a determination may be made from the pressure difference correlations and the filter efficiency correlations described above. In some example embodiments, the filter life model may indicate a predicted service life of the one or more recommended fuel filters at varying ISO codes (or other fuel cleanliness rating).

Figure 4:
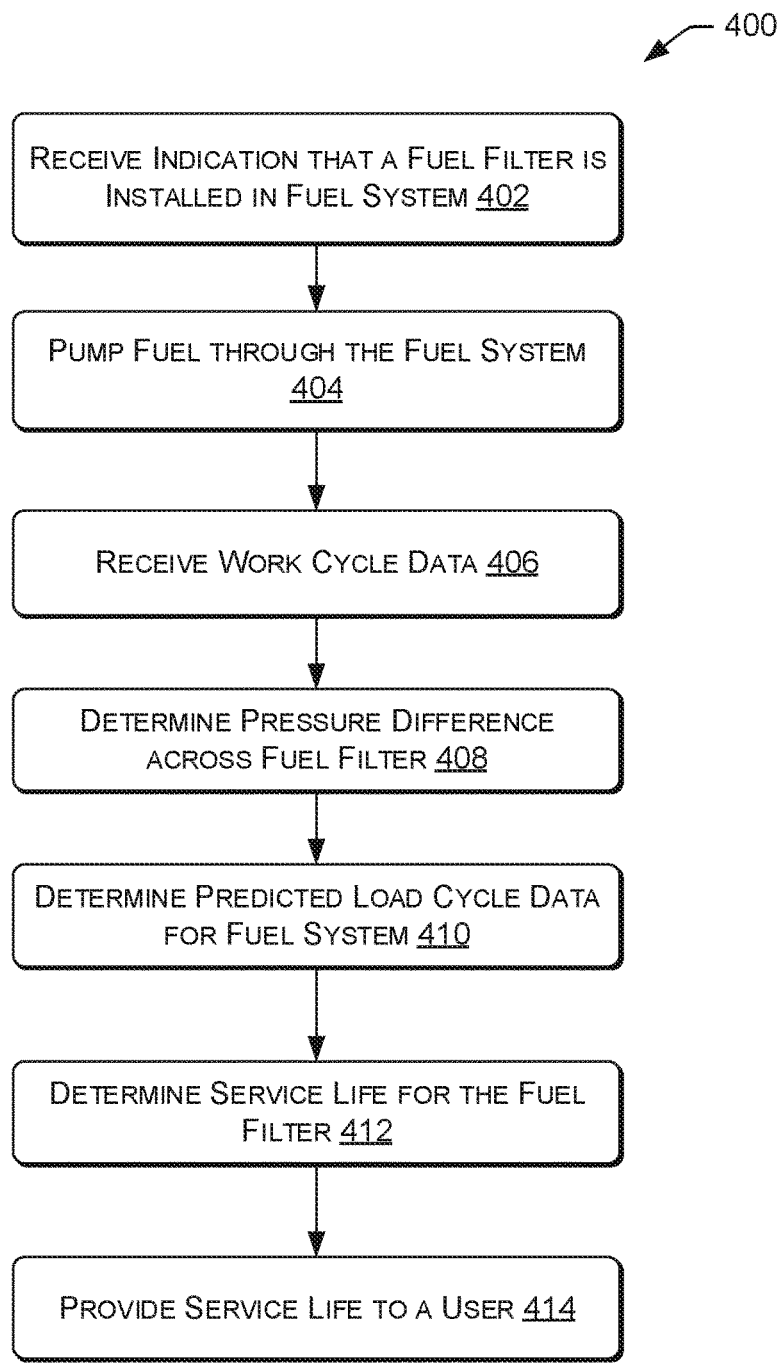
FIG. 4 is a flowchart illustrating an exemplary disclosed method for determining a service life of a fuel filter of the fuel system of FIG. 2, using the filter life model of FIG. 3.

FIG. 4 shows an exemplary method 400 for determining and/or monitoring a service life of a fuel filter 204. The method 400 of FIG. 4 may be performed at least in part by the controller 224, and in such an example, controller 224 may implement at least part of the filter life model (described above with respect to FIG. 3) during performance of method 400. The controller 224 may also access test data generated from the method 300 of FIG. 3 during performance of method 400. Additionally, and/or alternatively, the filter life model may be implemented as a design tool for operators of machines having fuel filters. For example, a designer may indicate a desired service life and/or cost for the fuel filter and, in response, the filter life model may output various types of fuel filters with their respective service lives and costs for a specific fuel system application.

At 402, the controller 224 may receive, from a user or ECM/ECU, an indication that a fuel filter 204 has been installed in the fuel system 200. Such an indication may include fuel filter data indicating a type of filter media, a fuel filter size, an estimated service life of the fuel filter, and/or additional fuel filter descriptions. The indication may further include information as to the type of machine (e.g., haul truck, loader, paver, bulldozer, etc.) that is currently utilizing and/or otherwise implementing the fuel system 200. Additionally, and/or alternatively, the controller 224 may receive, from a user, a possible fuel filter and/or filter media that may be implemented in a fuel system.

At 404, the controller 224 may cause the fuel pump 208 to direct fuel through the fuel system 200 in order to cause one or more outputs for the machine 100 (e.g., lifting, digging, turning, accelerating, etc.). While the controller 224 causes the fuel pump 208 to direct fuel through the fuel system 200, the controller 224 may receive fuel system data from one or more sensors 222 indicative of the performance of the fuel filter 204 and/or of the fuel system 200. The controller 224 records such fuel system data of the fuel system 200 as historical load cycle data.

At 406, the controller 224 may receive work cycle data from one or more machines that implement the fuel system 200 and/or a substantially same or similar fuel system. In some example embodiments, the work cycle data may be stored in the database 226 and the controller may retrieve the work cycle data therefrom. Additionally, and/or alternatively, the controller 224 may receive work cycle data via a network or other wireless connection from other machine controllers and/or other databases. Thus, the controller 224 may receive and/or update work cycle data received from one or more machines that utilize a similar or same fuel system 200.

At 408, the controller 224 may determine a pressure difference across the fuel filter 204. For example, the controller 224 may receive, from one or more sensors, upstream fuel pressure data, downstream fuel pressure data, and may determine a difference between the upstream fuel pressure and the downstream fuel pressure. The controller 224 may make this determination in real-time, at predetermined intervals, continuously, substantially continuously, and/or in response to a trigger/condition. As described above, the controller 224 may compare the pressure difference with other fuel system performance metrics such as fuel filter size, fuel flow rate, an amount of time the fuel system 200 has been operating with the fuel filter 204, etc.

At 410, the controller 224 may determine predicted load cycle data for the fuel system 200 based at least in part on the work cycle data and/or the historical data. For example, the controller 224 may determine from the work cycle data and/or the historical data typical fuel system load cycles. In other words, the controller 224 may determine typical fuel flow rates, fuel pressures, fuel consumption, etc. of a machine as the machine operates at a worksite or other environment. The predicted load cycle data may include predicted fuel flow rate data, predicted fuel pressure data, predicted fuel consumption data, predicted engine speed data, predicted particulate matter accumulation data, etc.

At 412, the controller 224 may determine a service life for the fuel filter 204 based in part on the predicted load cycle data for the fuel system 200. For example, the filter life model may determine a future pressure difference across the fuel filter 204 and/or a future filter efficiency value from the predicted load cycle data. As mentioned previously, the controller 224 may correlate the pressure difference and/or the filter efficiency value with an amount of particulate matter trapped by the fuel filter 204 from the process described in FIG. 3. By such correlations, the controller 224 may predict an amount of particulate matter that will accumulate in the fuel filter 204 thereby causing the pressure difference reached a predetermine value/threshold and/or causing the filter efficiency value to reach a predetermined value/threshold. Such a correlation may be represented by the following equation:

$$T = \left(\frac{\dot{Q}t}{A}\right)_{(c)} \left(\frac{A}{\dot{Q}}\right) \frac{[\psi_\eta]_{(c)}}{\psi_\eta} \quad (4)$$

where T=the service life, (c)=correlation test data, $\dot{Q}$=flow rate, A=area of the filter media, and $\psi_n$=particles trapped by the fuel filter. Thus, the service life of the fuel filter 204 may be calculated by equation (4) in addition to and/or alternatively to equation (3).

Furthermore, the filter life model may determine an estimated time in a service life interval at which the pressure difference and the filter efficiency value may reach the predetermined pressure difference value and/or the filter efficiency value. Thereby, the filter life model may estimate the predicted performance of the fuel filter at varying times of the service interval for the fuel filter 204. Furthermore, the filter life model may determine the degradation rate of the fuel filter 204. In such an embodiment, the filter life model may compare the degradation rate of the fuel filter 204 with degradation rates of alternative fuel filters operating (or simulated) under similar circumstances (e.g., fuel cleanliness ratings, operating locations, load cycles, etc.) to determine whether the fuel filter 204 maximizes the service life of the fuel filter. The filter life model may determine one or more alternate fuel filters that would increase the service life of the fuel filter based in part on the degradation rate.

At 414, the controller 224 may provide the service life to a user. For example, the controller 224 may send data associated with the service life to a user interface associated with the user. The data associated with the service life may include an expected service life interval for the fuel filter 204 in the specific fuel system 200 and one or more performance metrics associated with the fuel system 200 at various points in the service life interval. In some examples, the filter life model may be implemented as a design tool. For example, a user may input a potential or expected operating location for the fuel system, the fuel system in which the fuel filter may be used, and/or a desired service life interval (e.g., 1000 hours) and the filter life model may provide the user with one or more filter recommendations. The filter recommendations may include a fuel filter size and type of filter media in order to meet the desired service life interval under the real-world conditions under which the fuel filter may operate.

INDUSTRIAL APPLICABILITY

The present disclosure describes systems and methods for determining and monitoring a service life of a fuel filter 204 for a fuel system 200. Such systems and methods may be used to track the performance of the fuel filter 204 and/or the fuel system 200. Furthermore, the systems and methods described herein may be used to generate a filter life model that may predict the service life for a fuel filter 204. For example, a fuel filter 204 may be installed on a test bench that includes a fuel system designed to emulate a fuel system 200 in a machine 100. Fuel may be pumped through the fuel system 200 and the performance of the fuel filter 204 may be determined. In some examples, the fuel may be treated in order to emulate available fuel in a specific operating region (e.g., geographic regions such as the United States, India, China, Mexico, etc.). The systems and method described herein may then determine a service life for the fuel filter 204. Such a process may be repeated in order to create the filter life model.

The filter life model may be implemented as a design tool for operators (or other users) of machines using fuel filters. The filter life model may inform an operator's selection of a fuel filter (e.g., size, media type, and cost). Furthermore, the filter life model may be implemented in an ECM/ECU of a machine 100 to determine and/or monitor the service life of the fuel filter 204.

While aspects of the present disclosure have been particularly shown and described with reference to the embodiments above, it will be understood by those skilled in the art that various additional embodiments may be contemplated by the modification of the disclosed machines, systems and methods without departing from the spirit and scope of what is disclosed. Such embodiments should be understood to fall within the scope of the present disclosure as determined based upon the claims and any equivalents thereof.

What is claimed is:

1. A method for predicting a service life of a fuel filter in a fuel system, the method comprising:
    identifying one or more machines implementing a same or similar type of fuel system;
    retrieving work cycle data from the one or more machines, the work cycle data including at least one of engine speed data, fuel pressure data, or fuel flow rate data;
    causing a fuel pump of the fuel system to direct fuel through the fuel filter and the fuel system such that:
        a first flow rate of fuel through a first portion of the fuel system is substantially equal to a second flow rate indicated by the work cycle data, and
        a first fuel pressure of fuel in the first portion of the fuel system is substantially equal to a second fuel pressure indicated by the work cycle data;
    receiving, from one or more sensors of the fuel system, fuel system data;
    determining, from the fuel system data, a pressure difference across the fuel filter;
    determining that the pressure difference across the fuel filter is above a predetermined pressure difference threshold, wherein the predetermined pressure difference threshold is based at least in part on a type of filter media of the fuel filter; and
    determining a service life of the fuel filter based at least in part on the pressure difference being above the predetermined pressure difference threshold and using a filter life model, wherein the service life represents at least an amount of time that the fuel filter operates in the fuel system before the pressure difference reaches or exceeds the pressure difference threshold.

2. The method according to claim 1, further comprising:
    determining an operating location in which the fuel system is implemented, the operating location comprising at least a geographic region; and
    determining a fuel cleanliness rating for available fuel at the operating location.

3. The method according to claim 2, further comprising:
    determining a first particle distribution in the available fuel based at least in part on the fuel cleanliness rating;
    determining an amount of particulate matter to add to the fuel such that the fuel includes a second particle distribution that is substantially similar to the first particle distribution; and
    providing the amount of particulate matter to be added to the fuel to a user.

4. The method according to claim 1, further comprising:
    determining, from the fuel system data, an efficiency value of the fuel filter; and
    providing the efficiency value of the fuel filter to at least one of a user or the filter life model.

5. The method according to claim 1, further comprising:
    determining, from the fuel system data, an amount of particulate matter trapped by the fuel filter;
    determining a first correlation between the amount of particulate matter trapped by the fuel filter and an area of the filter media of the fuel filter, the first correlation representing the amount of particulate matter trapped by the fuel filter per unit area of the filter media;
    determining a second correlation between the amount of particulate matter trapped by the fuel filter and the first flow rate, the second correlation representing the amount of particulate matter trapped by the fuel filter at the first flow rate; and
    providing the first correlation and the second correlation to at least one of a user or the filter life model.

6. The method according to claim 1, further comprising:
    determining, from the work cycle data, predicted load cycle data of the fuel system, the predicted load cycle data including at least one of predicted engine speed data, predicted fuel pressure data, predicted fuel flow rate data, or predicted particulate matter accumulation data; and
    determining a predicted pressure difference across the fuel filter based at least in part on the predicted load cycle data, wherein
    the service life of the fuel filter is further based on the predicted pressure difference.

7. The method according to claim 5, further comprising:
    determining a third correlation between the pressure difference and the amount of particulate matter trapped by the fuel filter;
    determine, from the third correlation, a predicted amount of particulate matter trapped by the fuel filter, wherein when the fuel filter has trapped the predicted amount of particulate matter, the pressure difference across the fuel filter will meet or exceed the predetermined pressure difference threshold, and the service life of the fuel filter is further based on the predicted amount of particulate matter trapped by the fuel filter.

8. A fuel system comprising;
a reservoir;
at least one fuel pump;
a fuel filter having a filter media;
one or more sensors; and
a fuel system controller in communication with at least the one or more sensors, and the fuel pump, the fuel system controller being configured to:
 receive work cycle data from one or more machines that utilize a same or similar type of fuel system, the work cycle data including at least one of engine speed, fuel system pressure data, or fuel flow rate data;
 cause the fuel pump of the fuel system to direct fuel through the fuel filter and the fuel system;
 receiving, via the one or more sensors of the fuel system, fuel system data;
 determine, from the fuel system data, a pressure difference across the fuel filter;
 determine an amount of particulate matter trapped by the fuel filter relative to an area of the filter media or a flow rate at which the fuel is pumped through the filter media;
 determine, via the filter life model, a correlation between the pressure difference and the amount of particulate matter trapped by the fuel filter;
 determine, from the correlation, a predicted amount of particulate matter that when trapped by the fuel filter causes the pressure difference to reach or exceed the predetermined threshold, wherein
 the service life of the fuel filter is determined based on the predicted amount of particulate matter;
 determine, via a filter life model, predicted load cycle data for the fuel system based at least in part on the work cycle data; and
 determine, via the filter life model, a service life for the fuel filter based at least in part on the pressure difference and the predicted load cycle data, the service life representing at least a remaining amount of time that the fuel filter will operate in the fuel system before the pressure difference reaches or exceeds a predetermined threshold; and
 wherein the service life of the fuel filter is determined based on the predicted amount of particulate matter.

9. The fuel system according to claim 8, wherein the filter life model is configured to determine a degradation rate of the filter media based at least in part on the pressure difference across the fuel filter relative to an amount of time that the fuel is pumped through the fuel filter.

10. The fuel system according to claim 8, wherein the fuel system controller is further configured to determine, via the one or more sensors, a filter efficiency value.

11. The fuel system according to claim 8, wherein fuel system controller is further configured to:
 determine, via the filter life model, at least one of a predicted flow rate or a predicted fuel consumption based on the work cycle data received from the one or more machines, wherein the service life is based at least in part on the predicted flow rate or the predicted fuel consumption.

12. The fuel system according to claim 9, wherein the fuel system controller is further configured to identify, via the filter life model, an alternate filter media for the fuel filter to match the degradation rate of the filter media to an ideal degradation rate determined by the filter life model.

13. A fuel system comprising:
a reservoir;
at least one fuel pump;
a fuel filter having a filter media;
one or more sensors; and
a fuel system controller in communication with at least the one or more sensors, and the fuel pump, the fuel system controller being configured to:
 receive work cycle data from one or more machines that utilize a same or similar type of fuel system, the work cycle data including at least one of engine speed, fuel system pressure data, or fuel flow rate data;
 cause the fuel pump of the fuel system to direct fuel through the fuel filter and the fuel system;
 receiving, via the one or more sensors of the fuel system, fuel system data;
 determine, from the fuel system data, a pressure difference across the fuel filter;
 determine, via a filter life model, predicted load cycle data for the fuel system based at least in part on the work cycle data; and
 determine, via the filter life model, a service life for the fuel filter based at least in part on the pressure difference and the predicted load cycle data, the service life representing at least a remaining amount of time that the fuel filter will operate in the fuel system before the pressure difference reaches or exceeds a predetermined threshold; and
wherein the pressure difference is determined by subtracting downstream fuel pressure from upstream fuel pressure.

14. A method comprising:
pumping, by a fuel pump, fuel through a fuel filter in a fuel system;
receiving work cycle data from one or more machines, the work cycle data including at least one of fuel flow rate data or fuel pressure data;
determining, via one or more sensors of the fuel system, a pressure difference across the fuel filter;
determining a fuel contamination rating for the fuel in the fuel system;
determining a particle distribution of the fuel based at least in part on the fuel contamination rating;
receiving, via the one or more sensors, fuel consumption data;
determining a particulate accumulation value of particulate matter trapped by the fuel filter based on the particle distribution of the fuel and the fuel consumption data, the particulate accumulation value indicating at least a size and a quantity of the particulate matter that is trapped by the fuel filter;
determining, via a filter life model, predicted load cycle data for the fuel system based at least in part on the work cycle data; and
determining, via the filter life model, a filter service interval based at least in part on the pressure difference and the predicted load cycle data, the filter service interval representing an amount of time that the fuel filter is operable in the fuel system before the pressure difference across the fuel filter reaches a predetermined value.

15. The method according to claim 14, wherein the predetermined value is determined based at least in part on a type of filter media present in the fuel filter.

16. The method according to claim 14, wherein the filter life model for the fuel filter is based at least in part on the pressure difference across the fuel filter and the particulate accumulation value of the fuel filter over time.

17. The method according to claim 14, further comprising
 determining, via one or more particle counters, an efficiency value of the fuel filter; and
 determining, from the efficiency value, at least one of a size or quantity of the particulate matter that passes through the fuel filter.

* * * * *